Feb. 5, 1946.  J. M. O'SHAUGHNESSY  2,394,470
RECOVERY OF WASTE SULPHURIC ACID LIQUORS
Filed June 8, 1944    3 Sheets-Sheet 1

JAMES MICHAEL O'SHAUGHNESSY
INVENTOR.

BY Charles F. Kaegebehr
ATTORNEY

Feb. 5, 1946.   J. M. O'SHAUGHNESSY   2,394,470
RECOVERY OF WASTE SULPHURIC ACID LIQUORS
Filed June 8, 1944    3 Sheets-Sheet 3

JAMES MICHAEL O'SHAUGHNESSY
INVENTOR.

BY
Charles F. Kaegebehn
ATTORNEY

Patented Feb. 5, 1946

2,394,470

UNITED STATES PATENT OFFICE 2,394,470

RECOVERY OF WASTE SULPHURIC ACID LIQUORS

James M. O'Shaughnessy, Woodbridge, N. J., assignor to National Lead Company, New York, N. Y., a corporation of New Jersey Application June 8, 1944, Serial No. 539,332

13 Claims. (Cl. 23—172)

The present invention relates to a method for the treatment of industrial liquors containing sulphuric acid and constitutes a practical and economical means for the recovery of the sulphuric acid content of such liquors. Where such industrial sulphuric acid liquors contain, in addition to sulphuric acid, other valuable constituents, such as iron, or titanium, or both, the present invention provides means for the recovery of such other constituents as well as the sulphuric acid content.

The principal object of the present invention is to provide a practical and economical method for the recovery of the sulphuric acid content of industrial sulphuric acid liquors. Another important object of the present invention is the recovery of valuable constituents, other than sulphuric acid, which may be contained in such liquors. When sulphuric acid liquors containing titanium, for instance, a sulphuric acid solution of ilmenite, are treated according to the present invention, there is obtained a precipitate of hydrous titanium oxide which is especially suitable for further processing to useful titanium compounds, such as titanium pigments, especially pigmentary titanium dioxide of the rutile modification. Accordingly, a third important object of the present invention is to provide means for obtaining hydrous titanium oxide especially suitable for further processing into titanium dioxide pigments.

The present invention is adapted for the treatment of sulphuric acid liquors obtained either as waste from various industrial processes, for example, from the pickling of iron and steel, from the hydrolysis of sulphuric acid solutions of ilmenite, or from the treatment of sulphuric acid solutions obtained by treatment of minerals, such as, titaniferous ores. It is especially adapted for the recovery of hydrolysis mother liquors which contain, in addition to sulphuric acid, hydrochloric acid, the presence of which prevents, due to its highly corrosive nature, the effective and economic recovery of the sulphuric acid by the usual prior art methods.

The several essential steps comprising the process of the present invention are combined in such manner as to constitute a cyclical process in which the reagents employed are continuously reutilized for the treatment of sulphuric acid liquors, the end products thereof being sulphuric acid and possibly also the other valuable constituents, for example, iron or titanium compounds, or both.

The essential steps above referred to comprise:
(a) The treatment of the sulphuric acid liquor with iron sulphide thereby to form iron sulphate and hydrogen sulphide gas which is collected;
(b) The conversion of the iron sulphate formed in the first step to iron sulphide;
(c) The conversion of the hydrogen sulphide formed in the first step to sulphuric acid, and
(d) The reutilization of the iron sulphide for the treatment of additional acid liquor.

Fig. 1 illustrates an embodiment of the invention wherein the acid liquor is treated with iron sulphide as such, the iron sulphate solution is treated with alkaline earth metal sulphide, the mixed precipitate of alkaline earth sulphate and iron sulphide is subjected to a reducing treatment and the iron sulphide separated from the resulting alkaline earth metal sulphide, both of which are then reused in the process.

The foregoing steps will now be described in relation to several preferred embodiments of the present invention.

In the first step at least enough iron sulphide will be added to the sulphuric acid liquor either as such (Fig. 1) or as a mixture with alkaline earth sulphate obtained from previous operation of the process (Fig. 3), in order substantially completely to neutralize the sulphuric acid content of the liquor, it being understood that when treating a liquor containing titanium the sulphuric acid content will include the free acid as well as the acid regarded as combined with the titanium. The iron sulphide may be added to the liquor in any convenient form, either dry or, as is preferred, in the form of a wet filter cake. As a result of the addition of the iron sulphide, the sulphuric acid content of the liquor is converted to iron sulphate which remains in solution and hydrogen sulphide gas is evolved which is collected for subsequent conversion to sulphuric acid. This first step may be carried out at room temperature or, if desired, more elevated temperatures which may be found helpful in accelerating or completing the conversion. A very convenient method for carrying out the iron sulphide treatment especially when it contains alkaline earth metal sulphate is to leach the iron sulphide material with the acid liquor according to the well-known counter-current principle until it has been converted to iron sulphate and as such dissolved in the liquor.

When the acid liquor contains titanium, there will be obtained after the iron sulphide treatment a precipitate of hydrous titanium oxide. According to the present invention, this hydrous titanium oxide after proper adjustment of the pH to obtain a filterable product is separated from the mother liquor containing iron sulphate, and washed. It may be subsequently further processed to useful titanium compounds. For instance, when the iron sulphide treatment is carried out at room temperature the recovered hydrous titanium oxide, partially dehydrated if desired, is readily soluble in hydrochloric acid and when dissolved in this acid a solution is obtained which may be used for the preparation of a hydrous titanium oxide convertible upon calcination to pigmentary rutile titanium dioxide.

In the second step the iron sulphate contained in the mother liquor is converted to iron sulphide. This conversion is carried out with a metal sulphide capable of converting the iron sulphate to iron sulphide. As regards the metal sulphides useful in practicing the present invention any sulphide which stands above iron in the electromotive series may be used.

Figure 1:
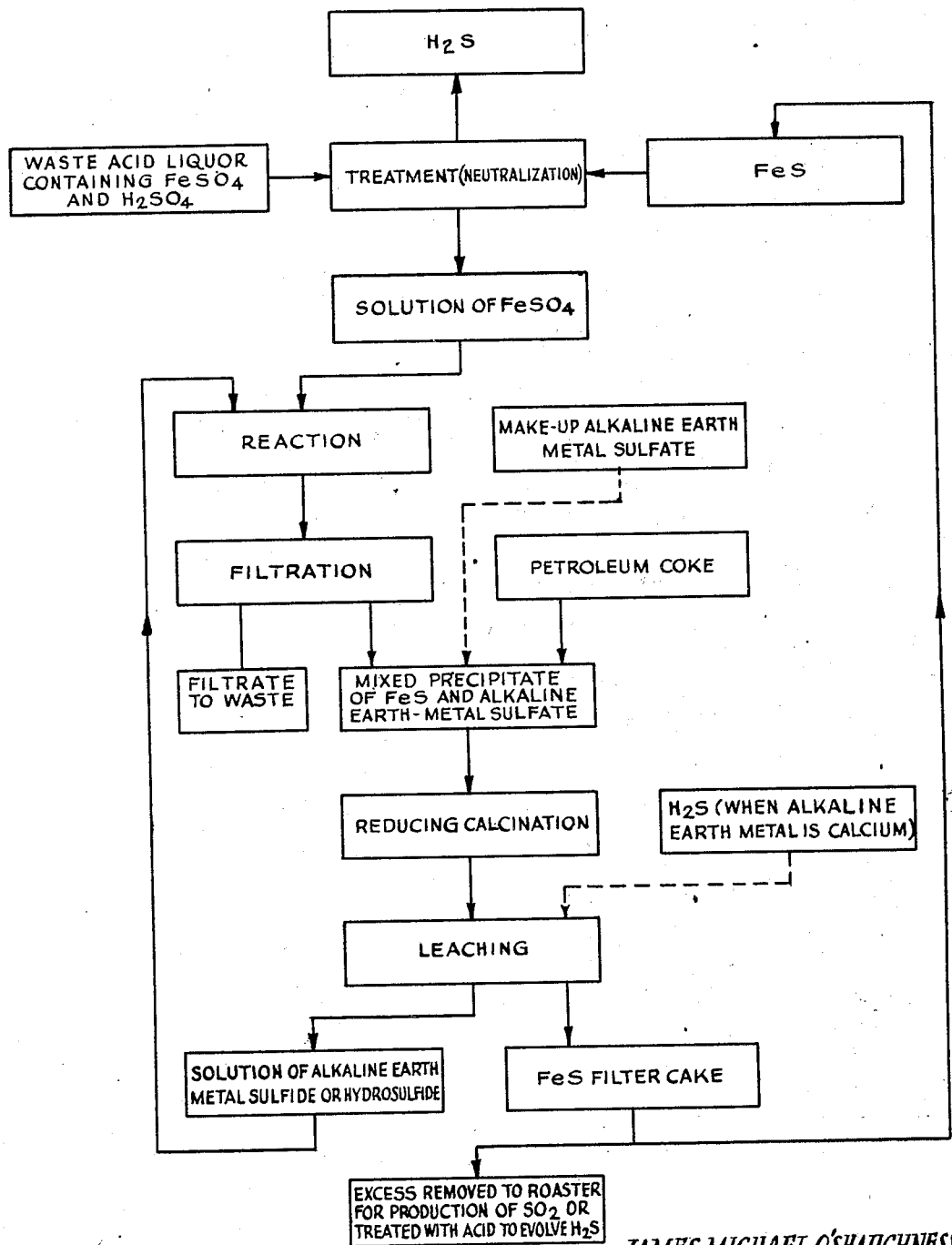
Figure 2:
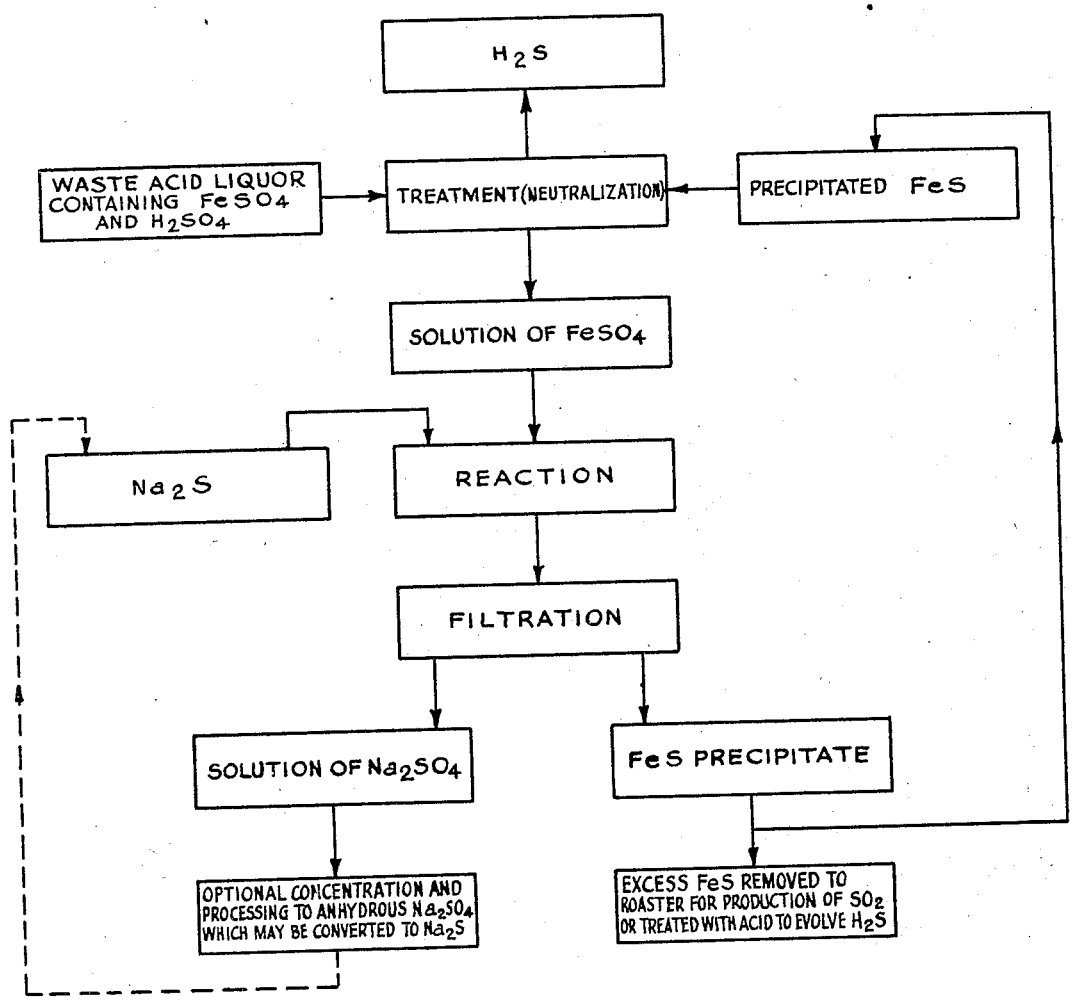
Fig. 2 illustrates the use of an alkali metal sulphide to convert the iron sulphate to iron sulphide.

According to the preferred method the metal sulphide which is to be added to the iron sulphate solution may be either an alkaline earth metal sulphide, or hydrosulphide (Figs. 1 and 3), e. g. the sulphides or hydrosulphides of calcium and barium, or with a soluble alkali metal sulphide, e. g. sodium or potassium sulphide (Fig. 2).

Figure 3:
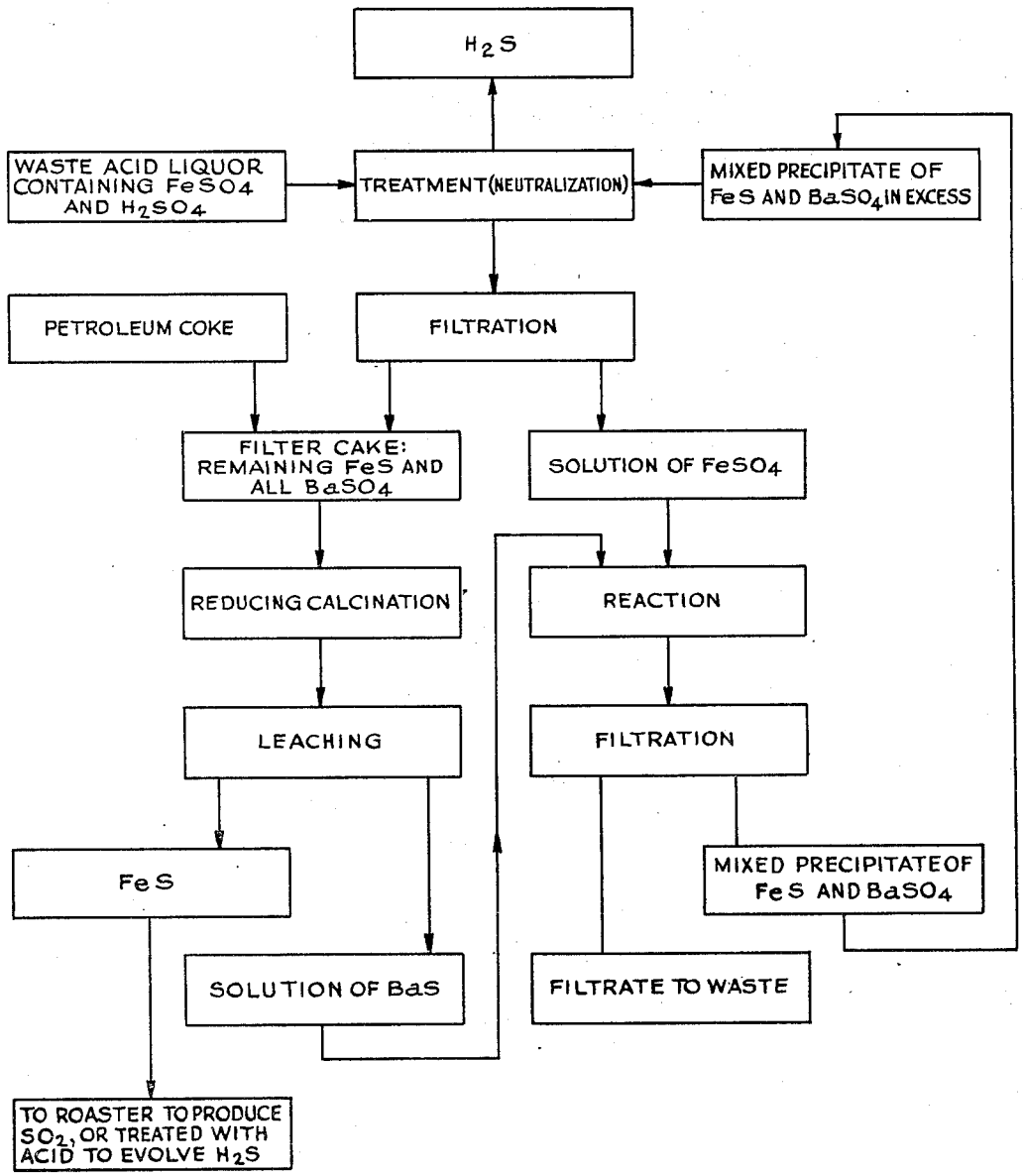
Fig. 3 illustrates an embodiment of the invention wherein the acid liquor is treated with a mixture of iron sulphide and alkaline earth metal sulphate obtained from a previous operation of the process.

According to those embodiments of the present invention which include the treatment of the iron sulphate liquor with alkaline earth metal sulphide or hydrosulphide there will be generally added to the iron sulphate liquor at least a sufficient amount of alkaline earth metal sulphide or hydrosulphide to convert substantially completely the iron sulphate to iron sulphide. From this treatment there will be obtained a mixed precipitate of iron sulphide and alkaline earth metal sulphate. The reutilization of the iron sulphide in this mixture for the treatment of an additional quantity of acid liquor may be effected in several ways. As illustrated in Fig. 1, it may be subjected to a reducing calcination to obtain a mixture of alkaline earth metal and iron sulphides which may be separated by leaching out the alkaline earth metal sulphate. The iron sulphide is then available for treating additional acid liquor and the solution of alkaline earth sulphide for conversion of iron sulphate to iron sulphide. Alternatively, as illustrated in Fig. 3, the mixed precipitate of alkaline earth metal sulphate and iron sulphide may be added in its entirety to a measured amount of additional acid liquor and after complete neutralization the excess iron sulphide and the alkaline earth metal sulphate may be separated by filtration from the resulting iron sulphate liquor. The alkaline earth metal sulphate together with the residual iron sulphide may then be subjected to a controlled reducing calcination in order to obtain a mixture of alkaline earth metal sulphide and iron sulphide. Another useful alternative, particularly for the treatment of acid liquors which do not contain any substantial amounts of titanium, contemplates the utilization of a portion of the mixed precipitate of iron sulphide and alkaline earth metal sulphate containing sufficient iron sulphide for the neutralization of the acid, in which case the iron sulphate liquor resulting therefrom will contain suspended alkaline earth metal sulphate which can be easily removed from the liquor as by decantation, filtration, etc. The alkaline earth metal sulphate may then be subjected to a reducing calcination for conversion to sulphide, either separately or in admixture with additional precipitate of iron sulphide and alkaline earth metal sulphate.

If the alkaline earth metal sulphide in the mixture obtained after the reducing treatment is barium sulphide, a simple leaching will suffice to separate the iron sulphide from the soluble barium sulphide, in which case the iron sulphide is reutilized for the treatment of additional acid liquor and the solution of barium sulphide utilized for the treatment of the resulting iron sulphate liquor. When the alkaline earth metal sulphide is calcium sulphide obtained by the reducing calcination of either calcium sulphate itself or the mixture of calcium sulphate and iron sulphide, it is preferable, since calcium sulphide is substantially insoluble in water, to treat the calcium sulphide in water suspension with hydrogen sulphide, preferably under pressure, in order to form the calcium hydrosulphide in which form it is utilized for the treatment of additional iron sulphate liquor. The use of calcium sulphide, dry or slurried in water, is however within the scope of this invention.

When a soluble alkali metal sulphide is employed in the practice of the present invention, as illustrated in Fig. 2, it will generally be found desirable to add at least a sufficient amount thereof, preferably in the form of a concentrated solution, to convert substantially all of the iron sulphate to iron sulphide. As a result of this treatment, there is obtained a precipitate of iron sulphide and a solution of alkali metal sulphate. The precipitated iron sulphide is next removed from the alkali metal sulphate solution, for instance, by decantation or filtration, or both. This iron sulphide is then available for treating additional amounts of sulphuric acid liquor. It will be understood, however, that in the practice of the present invention when the starting material itself contains iron, the iron sulphide which will be recovered by separation from the alkali metal sulphate solution will be in excess of that required to convert the sulphuric acid content of an additional equal quantity of acid liquor. The excess iron sulphide is "bled off" and may be processed to recover the sulphur content thereof as sulphur oxygen gases which may be used for the production of sulphuric acid. The alkali metal sulphate solution, according to this embodiment of the invention, may be evaporated in order to recover the alkali metal sulphate as a solid which in turn may be subjected to a controlled reducing calcination in order to convert the alkali metal sulphate to alkali metal sulphide, which in turn is used to treat further quantities of iron sulphate mother liquor. It will be understood that should the conversion of alkali metal sulphate to alkali metal sulphide prove more costly than the purchase of fresh alkali metal sulphide, the solution of alkali metal sulphate may be disposed of as such and fresh alkali metal sulphide used to treat the further quantities of iron sulphate liquor, all without departing from the scope of the present invention.

It is to be noted that the embodiment of the present invention as represented by Fig. 2 may include an evaporation step in which a considerable amount of water has to be removed. This evaporation may prove rather costly in practical applications of the present invention and it, therefore, may be found more economical to employ those embodiments of the present invention as represented by Figs. 1 and 3 wherein an alkaline earth metal sulphide is employed for the conversion of the iron sulphate to iron sulphide.

The following examples will more particularly illustrate, without limiting, the present invention.

EXAMPLE I

*(Illustrating the use of calcium hydrosulphide, according to Fig. 1)*

Two liters of an industrial sulphuric acid liquor obtained as mother liquor from the hydrolysis of a sulphuric acid ilmenite solution and analyzing as follows:

| | |
|---|---|
| Specific gravity | 1.188 |
| $H_2SO_4$ (g. p. l.) | 124 |
| $FeSO_4$ (g. p. l.) | 110 | were treated with 0.250 kilogram, dry basis, of wet ground commercial ferrous sulphide of about 90% FeS. The resultant 2.230 liters of liquor had the following analysis:

| | |
|---|---|
| Specific gravity | 1.246 |
| $FeSO_4$ (g. p. l.) | 271 |
| pH | 3.9 | and containing 0.604 kilogram of iron sulphate. The hydrogen sulphide gas evolved during this treatment was collected and oxidized to sulphur and water. The sulphur so obtained after drying was burned to sulphur dioxide for subsequent conversion to sulphuric acid by the well-known contact method.

To this liquor was added a solution containing about 119 grams per liter of calcium sulphhydrate until the pH reached about 7.0. A mixed precipitate of calcium sulphate and iron sulphide was obtained which was separated from the supernatant liquor by filtration. The filtrate was found to be free from iron salt.

The mixed precipitate of calcium sulphate and iron sulphide was mixed with 0.270 kilogram of granular petroleum coke and roasted for three hours at about 1000° C. in a rotary furnace. About 98.6% of the calcium sulphate was converted to calcium sulphide while the iron sulphide remained unchanged.

The mixture of calcium sulphide and iron sulphide was suspended in water and placed in an autoclave. Hydrogen sulphide was circulated through this suspension under a pressure of about 5 lbs. per square inch for about two hours. This treatment effected a conversion and solubilization of about 97.5% of the calcium sulphide as calcium sulphhydrate, after which the iron sulphide was separated from the solution of calcium sulphhydrate.

The recovered iron sulphide was about 0.341 kilogram, 0.225 kilogram of which were used for the treatment of additional 2.000 liters of sulphuric acid hydrolysis mother liquor, while the 0.116 kilogram of excess FeS was roasted to recover the sulphur values as $SO_2$ for subsequent conversion to sulphuric acid.

The solution of calcium hydrosulphide contained about 119 g. p. l. and was employed for the treatment of about 2.150 liters of iron sulphate liquor obtained as above described.

EXAMPLE II

*(Illustrating treatment of waste acid with mixed FeS—$BaSO_4$ precipitate according to Fig. 3)*

2.230 liters of iron sulphate solution

| | |
|---|---|
| Specific gravity | 1.246 |
| $FeSO_4$ (g. p. l.) | 271 |
| pH | 3.9 | obtained as described under Example I were treated with a hot concentrated solution of barium sulphide in stoichiometric amount. After agitation to complete the reaction at a pH of about 7.0 the mixed precipitate of barium sulphate and iron sulphide was filtered and washed. A filter cake containing 0.926 kilogram of $BaSO_4$ and 0.348 kilogram of FeS was obtained corresponding to one hundred per cent conversion. The filtrate was clear and was found to contain only a trace of soluble iron salt.

2.000 liters of sulphuric acid hydrolysis mother liquor of the same composition as that used in Example I was then treated with the mixed precipitate of FeS and $BaSO_4$ obtained in the preceding step. The neutralization was carried out countercurrently in two steps and continued until a complete neutralization had taken place, after which the iron sulphate liquor was separated by filtration from the mixture of the excess iron sulphide and barium sulphate and the filter cake washed.

2.700 liters of ferrous sulphate liquor of the following analysis:

| | |
|---|---|
| Specific gravity | 1.199 |
| $FeSO_4$ (g. p. l.) | 224 |
| pH | 4.1 | were obtained in this manner, equal to 0.604 kilogram of $FeSO_4$. 0.225 kilogram of iron sulphide were consumed in the reaction, while 0.123 kilogram of excess iron sulphide and 0.926 kilogram of barium sulphate were collected in the filter cake. The iron sulphate liquor was set aside. The filter cake of barium sulphate and unreacted iron sulphide was then mixed with make-up barium sulphate in the form of ground barytes and with granulated petroleum coke to give a mixture of the following composition:

| | Kilograms |
|---|---|
| FeS | 0.123 |
| $BaSO_4$ | 0.926 |
| Barytes | 0.103 |
| Petroleum coke | 0.300 |

The mixture was dried and then roasted in the absence of air at 1000° C. for about 3 hours to reduce the barium sulphate to barium sulphide. The charge was allowed to cool after which by countercurrent leaching with hot water 0.674 kilogram of BaS, equivalent to about 90 per cent conversion, were obtained in solution. This amount is slightly in excess of that required for the double decomposition of the 0.604 kilogram of ferrous sulphate (2.700 liters of 224 g. p. l. $FeSO_4$) obtained in the preceding operational cycle and was used to repeat the entire process.

The residue from the barium sulphide leaching was analyzed. The iron sulphide was found to be unchanged and only a small amount of unconverted barium sulphate was present in the residue, the non-leachable portion of the barium being predominantly present in the form of barium carbonate. This residue may be processed for its barium and sulphur values by known means with all the barium eventually converted to sulphate for return to the process for conversion to barium sulphide, in which case it becomes unnecessary to add any make-up barium sulphate for balancing the cyclic process.

EXAMPLE III
*(Illustrating the use of barium sulphide, according to Fig. 1)*

One liter of iron sulphate solution, obtained as described under Example I from the treatment of hydrolysis mother liquor with iron sulphide was treated with 0.303 kilogram of barium sulphide in the manner described under Example II. The mixed precipitate of barium sulphate and iron sulphide was combined with about 0.100 kilogram of granular petroleum coke and roasted for about three hours at about 1000° C. The barium sulphate was substantially completely converted to barium sulphide while the iron sulphide remained unchanged.

The barium sulphide was separated from the iron sulphide by leaching with hot water to obtain a solution of barium sulphide in the manner described in Example II.

The recovered iron sulphide was used for the treatment of additional sulphuric acid liquor and the barium sulphide solution for the treatment of additional iron sulphate solution in the manner described in Example I.

EXAMPLE IV
*(Illustrating the use of alkali metal sulphide, according to Fig. 2)*

One liter of iron sulfate solution equal to 0.270 kilogram of FeSO4 obtained as described under Example I, was treated with 0.139 kilogram of Na2S in the form of a hot concentrated solution under agitation. At completed conversion at a pH of about 7.0 the iron sulphide precipitate, equal to 0.156 kilogram of FeS, was filtered and washed. The filtrate, containing 0.253 kilogram of sodium sulphate free from iron, was concentrated and evaporated to dryness to produce anhydrous sodium sulphate. Conversion of the sodium sulphate back to sodium sulphide was accomplished by mixing with 0.100 kilogram of granulated petroleum coke and roasting for about 3 hours at 850–900° C. in the absence of air. The roasted material was leached with hot water to extract the sodium sulphide. The solution obtained contained 0.125 kilogram sodium sulphide equal to about 90 percent of the original sodium sulphate present as well as some sodium carbonate and a small amount of unconverted sodium sulphate.

0.109 kilogram FeS of the 0.156 kilogram produced were returned to the process for neutralization of a new portion of acid liquor, while the excess iron sulphide equal to 0.047 kilogram FeS were available for processing for reclamation of its sulphur values by roasting to SO2 or by other means.

The foregoing description of the present invention has been given for illustrative purposes only and the appended claims are intended to embrace all embodiments and modifications thereof which are within the skill of the art. For instance, if desired, the invention may be operated in such manner that neutralization of the waste acid liquid is carried out in several steps, or neutralized in one or more steps with an excess of iron sulphide which is then treated with additional acid liquor.

I claim:

1. Method for the treatment of industrial liquors containing sulphuric acid which comprises adding to such liquor iron sulphide to convert the sulphuric acid content of said liquor to iron sulphate, collecting the hydrogen sulphide gas evolved during the conversion of sulphuric acid and to iron sulphate converting by metathesis the iron sulphate to iron sulphide and utilizing the same for the treatment of additional sulphuric acid liquor.

2. Method for the treatment of industrial liquors containing sulphuric acid which comprises adding to such liquor iron sulphide in an amount sufficient substantially completely to convert the sulphuric acid content of said liquor to iron sulphate, collecting the hydrogen sulphide gas evolved during the conversion of sulphuric acid to iron sulphate and oxidizing the same to sulphuric acid, adding to the residual solution containing the iron sulphate a metal sulphide which stands above iron in the electromotive series in an amount sufficient substantially completely to convert the iron sulphate to iron sulphide and utilizing the resulting iron sulphide for the treatment of additional sulphuric acid liquor.

3. Method for the treatment of industrial liquors containing sulphuric acid which comprises adding to such liquor iron sulphide in an amount sufficient substantially completely to convert the sulphuric acid content of said liquor to iron sulphate, collecting the hydrogen sulphide gas evolved during the conversion of sulphuric acid to iron sulphate and oxidizing the same to sulphuric acid, adding to the residual solution containing the iron sulphate a soluble alkali metal sulphide in an amount sufficient substantially completely to convert the iron sulphate to iron sulphide, separating the precipitated iron sulphide from the residual alkali metal sulphate solution and utilizing the resulting iron sulphide for the treatment of additional sulphuric acid liquor.

4. Method for the treatment of industrial liquor containing sulphuric acid which comprises adding to such liquor iron sulphide in an amount sufficient substantially completely to convert the sulphuric acid content of said liquor to iron sulphate, collecting the hydrogen sulphide gas evolved during the conversion of sulphuric acid to iron sulphate and oxidizing the same to sulphuric acid, adding to the residual solution containing the iron sulphate a soluble alkali metal sulphide in an amount sufficient substantially completely to convert the iron sulphate to iron sulphide, separating the precipitated iron sulphide from the residual alkali metal sulphate solution and utilizing the resulting iron sulphide for the treatment of additional sulphuric acid liquor, separating the alkali metal sulfate as a solid from the residual alkali metal sulphate solution and heating the solid alkali metal sulphate under reducing conditions to reduce the same to alkali metal sulphide and utilizing the resulting alkali metal sulphide for the treatment of additional iron sulphate solution.

5. Method according to claim 3 wherein the alkali metal salt employed for the conversion of iron sulphate to iron sulphide is sodium sulphide.

6. Method according to claim 4 wherein the alkali metal salt employed for the conversion of iron sulphate to iron sulphide is sodium sulphide.

7. Method for treatment of industrial liquors containing sulphuric acid which comprises adding to such liquor iron sulphide in an amount sufficient substantially completely to convert the sulphuric acid content of said liquor to iron sulphate, collecting the hydrogen sulphide gas evolved during the conversion of sulphuric acid to iron sulphate and oxidizing the same to sulphuric acid, adding to the residual solution containing the iron sulphate a compound selected from the group consisting of the sulphides and sulphydrates of the alkaline earth metals in an amount sufficient substantially completely to convert the iron sulphate to iron sulphide, utilizing the mixed precipitate of iron sulphide and alkaline earth metal sulphate for the treatment of additional sulphuric acid liquor and after the said treatment separating the precipitated alkaline earth metal sulphate from the residual iron sulphate solution.

8. Method for the treatment of industrial liquors contaning sulphuric acid which comprises adding to such liquor iron sulphide in an amount sufficient substantially completely to convert the sulphuric acid content of said liquor to iron sulphate, collecting the hydrogen sulphide gas evolved during the conversion of sulphuric acid to iron sulphate and oxidizing the same to sulphuric acid, adding to the residual solution containing the iron sulphate a compound selected from the group consisting of the sulphides and sulphydrates of the alkaline earth metals in an amount sufficient substantially completely to convert the iron sulphate to iron sulphide, utilizing the mixed precipitate of iron sulphide and alkaline earth metal sulphate for the treatment of additional sulphuric acid liquor and after the said treatment separating the precipitated alkaline earth metal sulphate from the residual iron sulphate solution, heating the separated alkaline earth metal sulphate under reducing conditions to convert the same to alkaline earth metal sulphide and utilizing the said sulphide for the treatment of additional iron sulphate solution.

9. Method for the treatment of industrial liquors containing sulphuric acid which comprises adding to such liquor iron sulphide in an amount sufficient substantially completely to convert the sulphuric acid content of said liquor to iron sulphate, collecting the hydrogen sulphide gas evolved during the conversion of sulphuric acid to iron sulphate and oxidizing at least a part of the same to sulphuric acid, adding to the residual solution containing the iron sulphate a compound selected from the group consisting of the sulphides and sulphydrates of the alkaline earth metals in an amount sufficient substantially completely to convert the iron sulphate to iron sulphide, heating the mixed precipitate of iron sulphide and alkaline earth metal sulphate under reducing conditions to convert the alkaline earth metal sulphate to alkaline earth metal sulphide, separating the iron sulphide from the alkaline earth metal sulphide and utilizing the iron sulphide for the treatment of additional sulphuric acid liquor.

10. Method for the treatment of industrial liquors containing sulphuric acid which comprises adding to such liquor iron sulphide in an amount sufficient substantially completely to convert the sulphuric acid content of said liquor to iron sulphate, collecting the hydrogen sulphide gas evolved during the conversion of sulphuric acid to iron sulphate and oxidizing at least a part of the same to sulphuric acid, adding to the residual solution containing the iron sulphate a compound selected from the group consisting of the sulphides and sulphydrates of the alkaline earth metals in an amount sufficient substantially completely to convert the iron sulphate to iron sulphide, heating the mixed precipitate of iron sulphide and alkaline earth metal sulphate under reducing conditions to convert the alkaline earth metal sulphate to alkaline earth metal sulphide, separating the iron sulphide from the alkaline earth metal sulphide and utilizing the iron sulphide for the treatment of additional sulphuric acid liquor and the alkaline earth metal sulphide for the treatment of additional iron sulphate solution.

11. Method for the treatment of industrial liquors containing sulphuric acid which comprises adding to such liquor iron sulphide in an amount sufficient substantially completely to convert the sulphuric acid content of said liquor to iron sulphate, collecting the hydrogen sulphide gas evolved during the conversion of sulphuric acid to iron sulphate and oxidizing the same to sulphuric acid, adding barium sulphide to the residual solution containing the iron sulphate in an amount sufficient substantially completely to convert the iron sulphate to iron sulphide, heating the mixed precipitate of iron sulphide and barium sulphate under reducing conditions to convert the barium sulphate to barium sulphide, leaching the barium sulphide from the iron sulphide and utilizing the iron sulphide for the treatment of additional sulphuric acid liquor and the solution of barium sulphide for the treatment of additional iron sulphate solution.

12. Method for the treatment of industrial liquors containing sulphuric acid which comprises adding to such liquor iron sulphide in an amount sufficient substantially completely to convert the sulphuric acid content of said liquor to iron sulphate, collecting the hydrogen sulphide gas evolved during the conversion of sulphuric acid to iron sulphate and oxidizing at leaast a part of the same to sulphuric acid, adding calcium sulphydrate to the residual solution containing the iron sulphate in an amount sufficient substantially completely to convert the iron sulphate to iron sulphide, heating the mixed precipitate of iron sulphide and calcium sulphate under reducing conditions to convert the calcium sulphate to calcium sulphide, treating the mixed sulphides with water and hydrogen sulphide to convert the calcium sulphide to soluble calcium sulphydrate, separating the iron sulphide from the solution of calcium sulphydrate and utilizing the iron sulphide for the treatment of additional sulphuric acid liquor and the solution of calcium sulphydrate for the treatment of additional iron sulphate liquor.

13. Method for the treatment of industrial liquors containing sulphuric acid and titanium which comprises adding to such liquor iron sulphide in an amount sufficient substantially completely to convert the sulphuric acid content of said liquor to iron sulphate, separating hydrous titanium oxide precipitated during the conversion of the sulphuric acid to iron sulphate, collecting the hydrogen sulphide gas evolved during the said conversion and oxidizing the same to sulphuric acid, adding to the residual solution containing the iron sulphate a metal sulphide which stands above iron in the electromotive series in an amount sufficient substantially completely to convert the iron sulphate to iron sulfide and utilizing the resulting iron sulfide for the treatment of additional acid liquor.

JAMES M. O'SHAUGHNESSY.